US011455713B2

(12) United States Patent
Tang et al.

(10) Patent No.: US 11,455,713 B2
(45) Date of Patent: Sep. 27, 2022

(54) AUTOMATIC DOCUMENT PROCESSING

(71) Applicant: PayPal, Inc., San Jose, CA (US)

(72) Inventors: Quan Jin Ferdinand Tang, Singapore (SG); Jiyi Zhang, Singapore (SG); Xiaodong Yu, Singapore (SG); Shek Hei Wong, Singapore (SG); Long Phi Huynh, Singapore (SG); Quan Anh Nguyen, Singapore (SG); Hans Tananda, Surabaya (ID); Kai Xie, Singapore (SG)

(73) Assignee: PayPal, Inc., San Jose, CA (US)

( * ) Notice: Subject to any disclaimer, the term of this patent is extended or adjusted under 35 U.S.C. 154(b) by 33 days.

(21) Appl. No.: 16/870,627

(22) Filed: May 8, 2020

(65) Prior Publication Data

US 2021/0350516 A1 Nov. 11, 2021

(51) Int. Cl.
*G06F 16/93* (2019.01)
*G06F 16/583* (2019.01)
*G06N 3/04* (2006.01)
(Continued)

(52) U.S. Cl.
CPC ........ *G06T 7/0002* (2013.01); *G06F 16/5854* (2019.01); *G06F 16/93* (2019.01);
(Continued)

(58) Field of Classification Search
CPC ........ G06T 7/0002; G06T 2207/20081; G06T 2207/20084; G06T 2207/30168;
(Continued)

(56) References Cited

U.S. PATENT DOCUMENTS 10,515,393 B2 12/2019 Todasco et al.
2014/0372449 A1 12/2014 Chittar
(Continued)

OTHER PUBLICATIONS

Joseph Redmon et al., "You Only Look Once: Unified, Real-Time Object Detection," 2016 IEEE Conference on Computer Vision and Pattern Recognition (CVPR), 10 pages.
(Continued)

*Primary Examiner* — Omar S Ismail
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed relating to determining whether document objects included in an image correspond to known document types. In some embodiments, a computing system maintains information specifying a set of known document types. In some embodiments, the computing system receives an image that includes objects. In some embodiments, the computing system analyzes, using a first neural network, the image to identify a document object and location information specifying a location of the document object within the image. In some embodiments, the computing system determines, using a second neural network, whether the document object within the image corresponds to a document type specified in the set of known document types, where the determining is performed based on the location information of the document object. In some embodiments, disclosed techniques may assist in automatically extracting information from documents, which in turn may advantageously decrease processing time for onboarding new customers.

20 Claims, 9 Drawing Sheets

(51) Int. Cl.
*G06T 7/00* (2017.01)
*G06N 20/00* (2019.01)

(52) U.S. Cl.
CPC ........... *G06N 3/0454* (2013.01); *G06N 20/00* (2019.01); *G06T 2207/20081* (2013.01); *G06T 2207/20084* (2013.01); *G06T 2207/30168* (2013.01)

(58) Field of Classification Search
CPC ... G06F 16/5854; G06F 16/93; G06N 3/0454; G06N 20/00
See application file for complete search history.

(56) References Cited

U.S. PATENT DOCUMENTS

| | | | |
|---|---|---|---|
| 2017/0011185 A1* | 1/2017 | Schweizer | G16H 30/40 |
| 2017/0193310 A1* | 7/2017 | Yu | G06V 20/41 |
| 2018/0137350 A1* | 5/2018 | Such | G06N 3/0454 |
| 2019/0286932 A1* | 9/2019 | Du | G06V 10/50 |
| 2019/0325259 A1* | 10/2019 | Murphy | G06V 20/41 |
| 2019/0354818 A1* | 11/2019 | Reisswig | G06N 3/04 |
| 2019/0362186 A1* | 11/2019 | Irshad | G06V 10/82 |
| 2020/0110930 A1* | 4/2020 | Simantov | G06V 30/412 |
| 2020/0167905 A1* | 5/2020 | Bian | B25J 9/1697 |
| 2020/0327360 A1* | 10/2020 | Samala | G06V 10/82 |
| 2021/0117948 A1* | 4/2021 | Voss | G06N 3/08 |
| 2021/0125034 A1* | 4/2021 | Nguyen | G06V 10/454 |
| 2021/0224969 A1* | 7/2021 | Zagaynov | G06N 20/10 |

OTHER PUBLICATIONS

Wei Liu et al., "SSD: Single Shot MultiBox Detector," https://arxiv.org/abs/1512.02325; [Submitted on Dec. 8, 2015 (v1), last revised Dec. 29, 2016 (this version, v5)]; 2 pages. [Retrieved Apr. 29, 2020].

* cited by examiner

AUTOMATIC DOCUMENT PROCESSING

BACKGROUND

Technical Field

This disclosure relates generally to processing documents, and, more specifically, to techniques for automatically identifying document types.

Description of the Related Art

In many situations, users may upload scanned or photographed images of documents to provide their information for review. For example, users may wish to open an account of some sort (e.g., a bank account), schedule travel plans, apply for a mortgage, or any of various other activities a user would like to participate in that involve user evaluation. In one particular example situation, online customer service companies may wish to onboard new clients by verifying or authenticating documentation associated with these clients. For example, a company may require users to upload documents for identification and verification purposes. Once these documents are uploaded to the company's online system, operators perform tedious manual review to collect and verify information included in the documents, such as an identity of a client. In addition, if the operator determines that the quality of an image of an uploaded document inhibit extraction of necessary user information, then the operator asks the user to re-upload the documents or upload additional documentation. This process is time consuming, error prone, and often involves a long feedback time for new clients.

Figure 1:
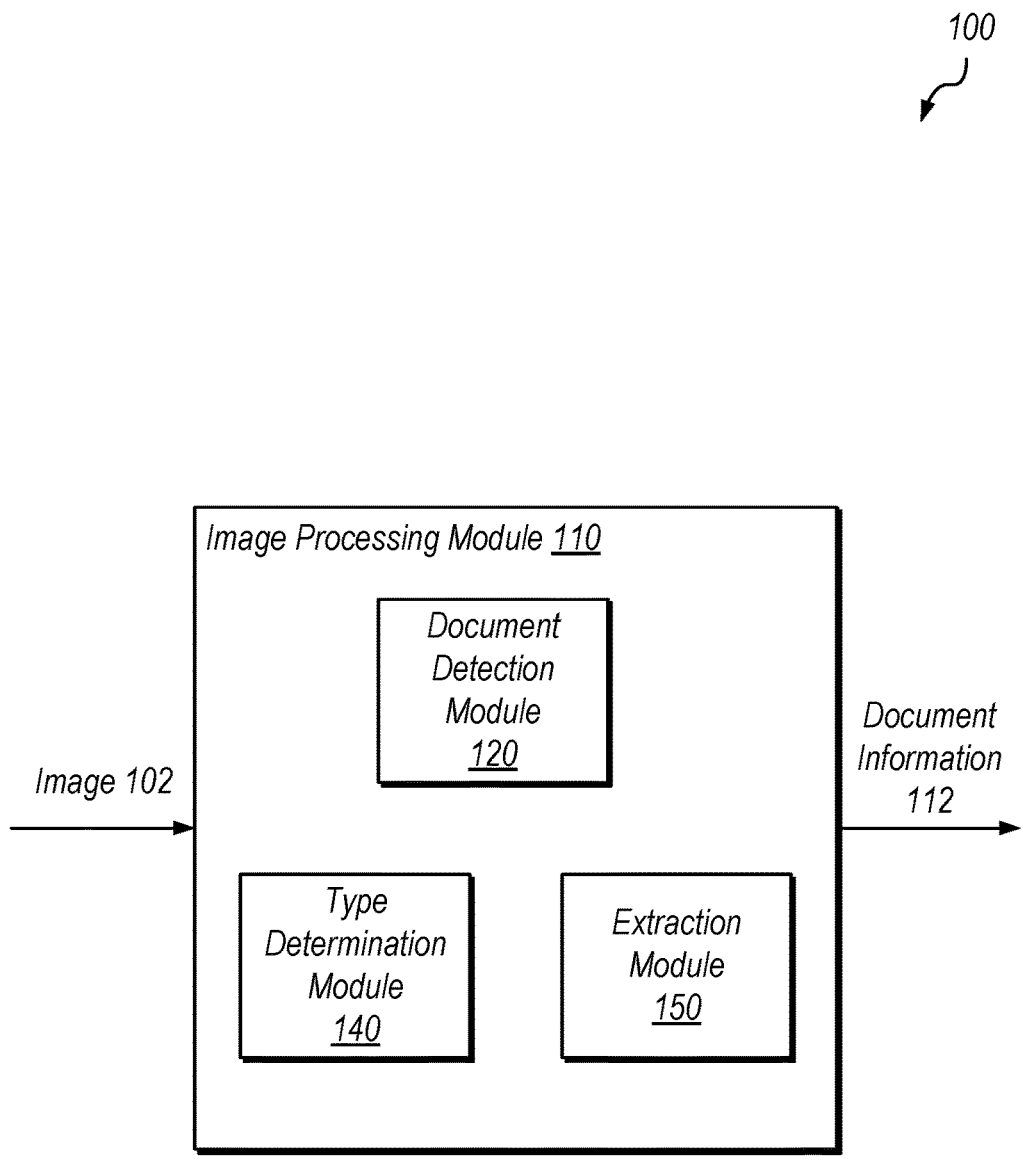
FIG. 1 is a block diagram illustrating an example system for automatically processing images uploaded by users, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "image processing system configured to process images to determine document types" is intended to cover, for example, a computer system that performs this function during operation, even if it is not currently being used (e.g., when its power supply is not connected). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a computing system having multiple user accounts, the terms "first" and "second" user accounts can be used to refer to any users. In other words, the "first" and "second" user accounts are not limited to the initial two created user accounts, for example. When the term "or" is used in this disclosure with respect to a list of options, it will generally be understood to be used in the exclusive sense unless the context provides otherwise. Thus, a recitation of "x or y" is equivalent to "either x or y, but not both." On the other hand, a recitation such as "x or y, or both" is to be interpreted in the inclusive sense.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, a "module" refers to software and/or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as operable to perform operations refers to both a software and a hardware module.

DETAILED DESCRIPTION

Software systems frequently need to recognize and extract information from documents submitted by users. For example, users may wish to or may be required to scan information or capture images of information and provide this information for review. For example, a user may scan a document and upload the scanned document file to their personal computer. This file may then be used by some system to evaluate a user associated with the uploaded information or may simply be stored, along with file metadata, for later use. In many situations, information is extracted from such document images in order to satisfy a user request for some task. For example, a user may upload scanned patient files to provide an electronic copy of patient data in addition to paper or hardcopy versions. In this example, patient data may be extracted from the scanned files and stored in a database table (e.g., an excel spreadsheet). As another example, a user may wish to open a bank account and, therefore, may upload images of their pay stubs. As yet another example, a user may wish to purchase a plane ticket and may scan their passport or ID. Further, as a different example, a user may apply for a job by uploading an image of their driver's license and resume.

As one particular example, detecting, marking, or extracting data from documents is often an important part of onboarding new customers to a customer facing system (such as a customer relationship management (CRM) system). This onboarding process, however, involves manual examination of uploaded images (of documents) which is often tedious and error prone. For example, a system administrator or customer agent of a customer facing system may manually identify an area of interest within a particular type of document, such as a user's legal name on some form of identification. In addition, system administrators may reject documents which are not supported by the system or are of poor quality. For example, if a user uploads an image of a Singapore driver's license and the system expects a United States driver's license, then the system administrator may reject the image and notify the customer to submit additional documentation. As another example, an image may be rejected if the information depicted in an image of the document is illegible (e.g., if the image is blurry). In some situations, this causes delays in the review process which, in turn, may slow down the onboarding process and provide a poor customer experience.

Techniques are disclosed for determining document types for documents included in an image and extracting information from these documents based on the determined type. For example, a user may request to open an account with a CRM system and is prompted by the system to upload an image of some form of identification. Once the user has uploaded an image of their documentation, the system analyzes the image to identify documents within the image, as well as bounding boxes of these documents using a single-pass neural network. The system then feeds the output of the single-pass neural network, which includes information specifying identified documents and bounding boxes of these documents, into a residual neural network to determine whether documents included in the image correspond to various known types of documents. For example, the residual neural network may identify that the image uploaded by the user contains a United States driver's license from the state of California.

Based on this information, the system is able to automatically extract information from the image of the driver's license using computer vision techniques. For example, the system may know to extract the user's legal name from a particular location within the document based on this document being a passport. The system may perform extraction of information using defined templates for certain types of documents or, may perform optical character recognition (OCR) on selective areas that are known for a particular type of document to contain important information. Once the system has extracted identifying information from the document, the system may verify the identity of the user and onboard the user by generating an account for the user and associating the extracted information with the user account.

In some situations, the disclosed techniques may improve the chances of a system being able to complete know-your-customer (KYC) processes more quickly. This may, in turn, advantageously improve user experience by allowing users to quickly open and utilize CRM services, for example. In addition, the disclosed techniques may improve the accuracy with which user information is extracted from documentation and stored in a user information account associated with a given user. The disclosed document type identification techniques may allow for automated data extraction, which may remove the need for tedious manual data extraction. In some situations, the disclosed document identification techniques may assist in using templates for certain types of documents for extracting information from images of documents using computer vision techniques. For example, a system may be configured to receive documents from users all over the world, resulting in various different types of documents being uploaded by users. As one specific example, a user from the United States may upload a state driver's license, while a user from France may upload French passport.

The disclosed techniques may also assist in quickly identifying whether the user has uploaded a document that is not supported by the system or whether the quality of the image is too poor for the system to perform data extraction. Such poor-quality images may be rejected by the disclosed system. In some situations, the disclosed system may provide integrated tools to allow users to manipulate their images prior to submitting them as part of an onboarding process. For example, a user may perform some form of preprocessing on an image to attempt to remove a glare or to improve the clarity, or both of the image. If, after such preprocessing, the system determines that the image is unusable, the system may reject the image.

Example Image Processing Module

FIG. 1 is a block diagram illustrating an example system for automatically processing images uploaded by users. In the illustrated embodiment, system 100 includes an image processing module 110.

Image processing module 110, in the illustrated embodiment, includes a document detection module 120, a type determination module 140, and an extraction module 150. Image processing module 110 receives an image 102 and generates document information 112 based on one or more documents included in the image. For example, document information 112 may specify a type of document included in the image, as well as information extracted from this document based on the specified type. As one specific example, document information 112 may specify that an image depicts a driver's license as well as a person's name, the driver's license number, the expiration date of the driver's license, etc.

In order to determine document information 112 from image 102, image processing module 110 maintains a set of known document types. This set of known document types may include types of documents that are accepted by system 100 for identification and onboarding purposes, for example. This set of document types is then used to identify documents included in image 102 in order to automatically extract information from the image. For example, documents uploaded to system 100 may include one or more of the following non-limiting examples: identifiers (driver's license, state ID, student ID, employee ID, birth certificate, etc.), contracts (employment contracts, business contracts, etc.), payment information (credit card, payroll documents, etc.), utility bills (e.g., electricity, gas, etc.) etc. Generation of this set of known document types is discussed below with reference to FIG. 2.

In some embodiments, system 100 is a customer relationship management system that allows various users to open and manage private accounts for conducting their business. In order to onboard such users, system 100 may request identification information from these users for authentication purposes, for example. System 100 may utilize image processing module 110 to automatically extract information from images uploaded by these customers to system 100. The modules used in this automated process are discussed in detail below with reference to FIGS. 3, 5, and 6.

Example Machine Learning Training

Figure 2A:
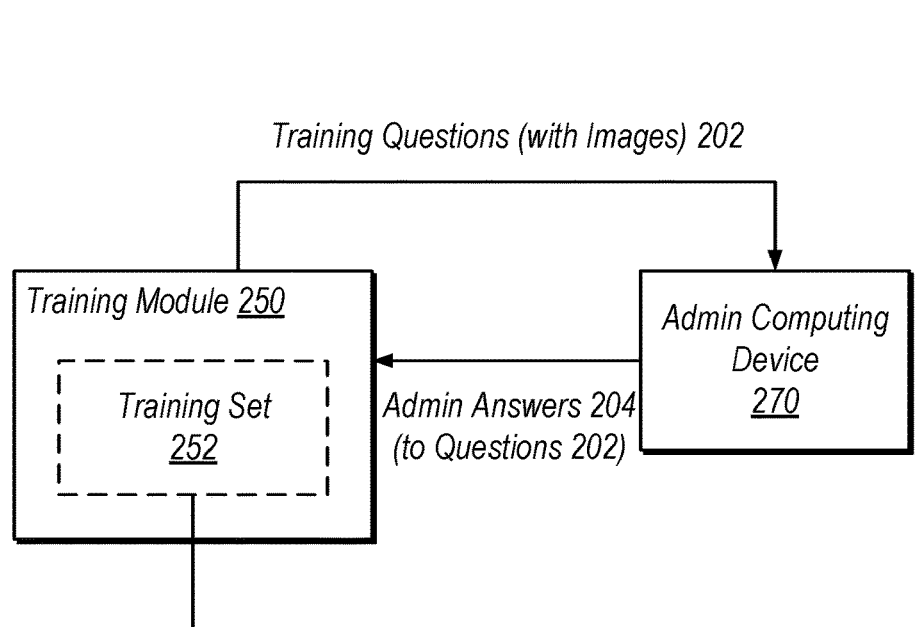
FIG. 2A is a block diagram illustrating example machine learning training module, according to some embodiments.

FIG. 2A is a block diagram illustrating example machine learning training module, according to some embodiments. In the illustrated embodiment, system 200 includes a training module 250 and an admin computing device 270. System 200 is configured to generate a training set 252 for training a machine learning module.

Training module 250, in the illustrated embodiment, sends a set of training questions 202 with images to admin computing device 270. This set of training questions 202 may correspond to a set of images, for example, that depict documents. In some cases, the images include objects that are not documents. In response to these questions 202, a user, such as a system administrator, sends admin answers 204 to training module 250. Based on answers 204 and the images sent with questions 202, training module 250 generates and outputs a training set 252 for training a machine learning module (e.g., module 260). For example, training module 250 may generate training labels for one or more images.

In some embodiments, the training questions relate to objects included in the images. These training questions may be different depending on the machine learning model which they will be used to train. For example, in some embodiments, training module 250 is executable to generate a training set 252 for training a residual neural network. In other embodiments, training module 250 is executable to generate a training set 252 for training a single-pass neural network (e.g., a you-only-look-once (YOLO) neural network, a single shot multibox detector (SSD), etc.). These two example machine learning models are discussed in further detail below with reference to FIGS. 3-5.

In the context of generating a training set for training a residual neural network, training questions 202 may ask what type of document(s) are included in an image. For example, a system administrator may specify that an image includes a student ID. In some situations, the system administrator may specify sub-categories of documents (e.g., a driver's license is issued for the state of Texas). In addition, training questions 202 may ask whether types of documents included in an image are supported by system 100. For example, in response to the question of whether a driver's license depicted in an image is a supported document, a system administrator may select "yes" from a dropdown menu of answer options. As another example, training questions 202 may ask "Are there any documents that are not detected?" In this example, if the system administrator indicates that there are documents that were not detected, then the next training question may ask the system administrator to draw bounding boxes for undetected documents. In some situations, the questions may ask the system admin to select portions of an image that contain a document that was not detected. In some embodiments, based on answers 204 from admin computing device 270 specifying whether various types of documents are supported by system 100, training module 250 generates a set of known document types. This set of known document types may include one or more types of documents that are usable by system 100 to onboard a user.

In the context of generating a training set for training a single-pass neural network (such as single-pass neural network 360), training questions 202 may ask whether an image is of an acceptable quality (e.g., is the content of the image legible). In addition, training questions may request that a user specify which portions of an image include documents. Training module 250 may place a grid over an image, for example, separating the content of the image into separate boxes. In this example, a training question may request: "Please select all boxes in the image that include documents." In other situations, a training question may ask whether a particular grid cell of an image grid includes a document. In some situations, training questions 202 may request that a system administrator draw bounding boxes for document(s) included in an image. In some situations, the training questions 202 may ask a system administrator to select document types depicted in an image from a list of possible document types. Alternatively, a training question may suggest that an identified document is a particular type and ask for confirmation.

As used herein, the term "machine learning" is intended to be construed according to its well-understood meaning, which includes computer algorithms that build mathematical models based on training data in order to recognize patterns in data. For example, machine learning algorithms learn through experience. Neural networks are one example of a machine learning algorithm. The term "neural network" is intended to be construed according to its well-understood meaning in the art, which refers to a computational model for use by a computing system, where the model uses a number of nodes that exchange information according to a specified set of parameters and functions. Each node is typically connected to many other nodes, and links between nodes may be enforcing or inhibitory in their effect on the activation of connected nodes. The nodes may be connected to each other in various ways; one example is a set of layers where each node in a layer sends information to all the nodes in the next layer (although in some layered models, a node may send information to only a subset of the nodes in the next layer).

As used herein, the term "single-pass neural network" refers to a neural network that predicts labels for input features in a single evaluation. One example of a single-pass neural network is the YOLO network, which predicts locations and class probabilities of objects in images. This type of neural network is in contrast to a convolutional neural network (CNN), for example, which may perform object detection in two stages by first selecting interesting portions of an image and then classifying objects within those regions. As used herein, the term "residual neural network" is intended to be construed according to its well-understood meaning, which includes an artificial neural network that uses skip connections to jump over certain layers in the neural network. For example, in traditional neural networks, each layer feeds directly into the next layer, while in residual neural networks each layer is fed directly into the next layer as well as into a layer two or more hops away from the current layer. This type of neural network may be used to avoid the problem of vanishing gradients, for example, by reusing activations from previous layers to allow an adjacent layer time to learn. In some embodiments of the present disclosure, neural networks such as the YOLO and residual neural networks are used to implement computer vision machine learning models. As used herein, the term "computer vision" is intended to be construed according to its well-understood meaning, which includes a processing block that takes images or videos, or both as inputs and predicts labels for content of these images or videos, or both. Image recognition, visual recognition, and facial recognition are examples of computer vision technology.

Figure 2B:
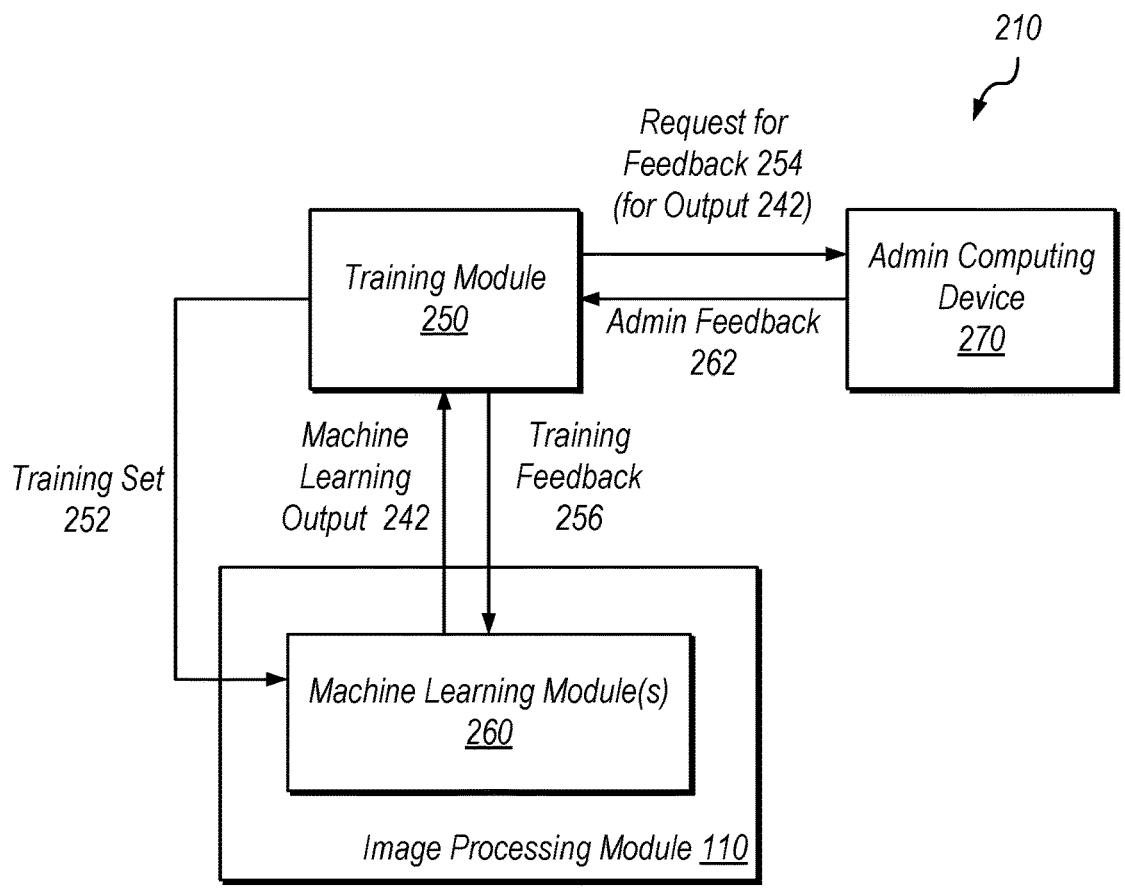
FIG. 2B is a block diagram illustrating example training of a machine learning module, according to some embodiments.

FIG. 2B is a block diagram illustrating example training of a machine learning module 260. In the illustrated embodiment, system 210 includes image processing module 110 with machine learning module(s) 260, training module 250, and admin computing device 270. Note that the training configuration shown in FIG. 2B may be used to train various types of machine learning modules 260 included in image processing module 110. For example, the two different training sets 252 described above with reference to FIG. 2A may be used to train two different machine learning models, such as a single-pass neural network and a residual neural network.

Training module 250, in the illustrated embodiment, inputs training set 252 into a particular machine learning module 260. Based on this input, the particular machine learning module 260 generates machine learning output 242 and provides this output to training module 250. Training module 250 then sends a request for feedback 254 for the output 242 to admin computing device 270. Admin computing device 270 provides admin feedback 262 to training module 250. Training module 250 provides training feedback 256 to the particular machine learning module 260. Training feedback 256 may include, for example, adjustments for weights used in training set 252 to train the particular machine learning module 260.

As discussed above, in some situations, training module 250 generates a training set 252 for a single-pass neural network. In this example situation, training module 250 trains the single-pass neural network (one example of machine learning module(s) 260) based on admin feedback 262. This feedback 262 may specify whether machine learning output 242 generated by the single-pass neural network is correct. For example, output 242 of a single-pass neural network may indicate document object classifications and location information for objects included in images (included in training set 252). Specifically, if the single-pass neural network outputs a classification specifying that an object in an image is a document, admin feedback 262 may specify that this classification is incorrect, and training module 250 adjusts training weights accordingly. A single-pass neural network is discussed in further detail in FIG. 3.

Similarly, when training a residual neural network, training module 250 may adjust training weights (specified in training feedback 256) based on admin feedback 262 for output 242 of the residual neural network. For example, output 242 from the residual neural network may specify a document type and a confidence score (e.g., a number between 0 and 1) for a document included in an image. The confidence score may specify the residual neural network's confidence that the predicted document type is a correct type. In some situations, the residual neural network may output a confidence score as a percentage. A system administrator may provide feedback 262 specifying whether the document type output by the residual neural network is correct. In some situations, based on the confidence score included in output 242 and admin feedback 262 specifying if the document type is correct, training module 250 adjusts training weights and performs additional training of the residual network using these adjusted weights.

Figure 6:
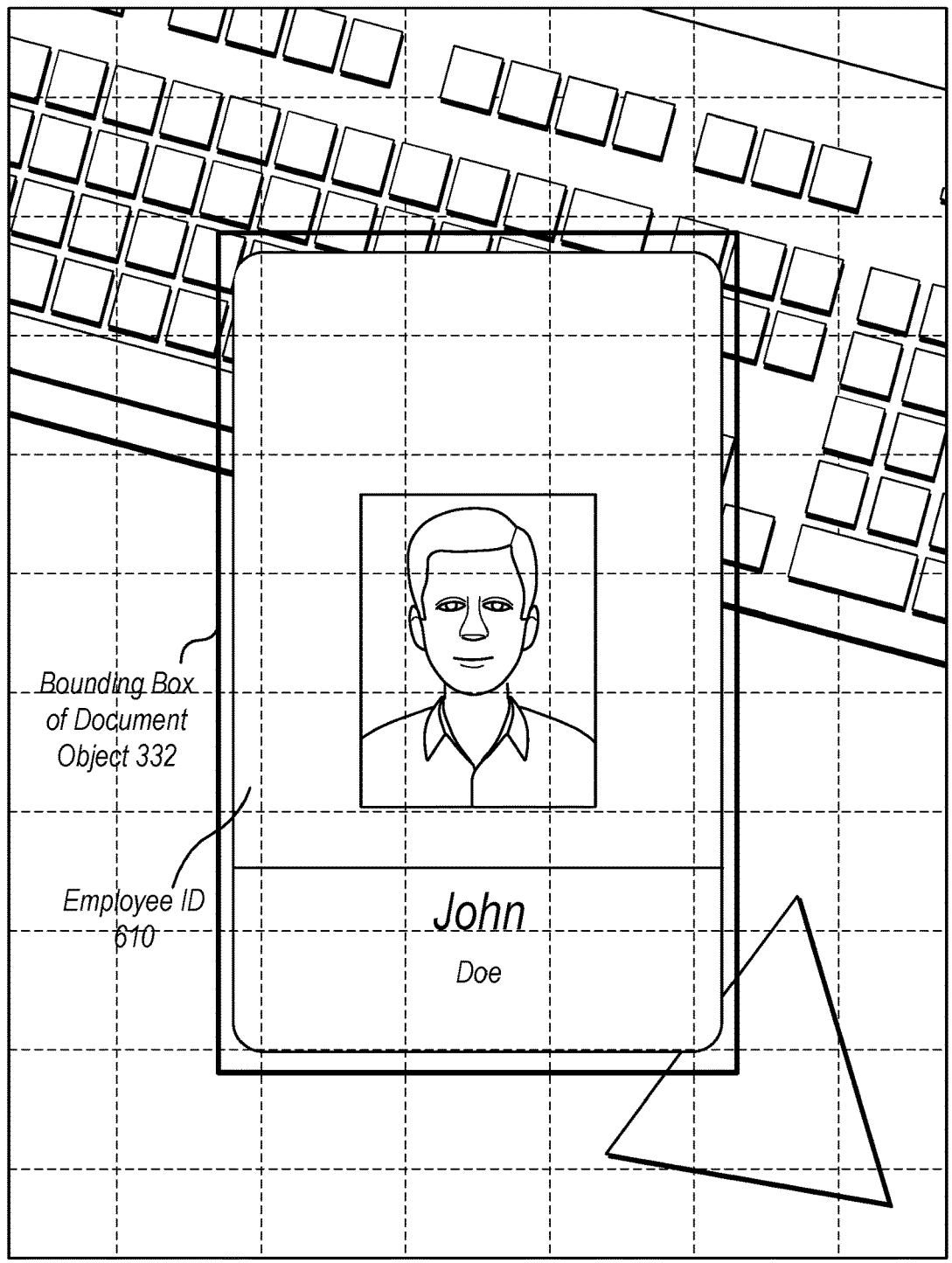
FIG. 6 is a diagram illustrating an example image of a document object, according to some embodiments.

As used herein, the term "document object" refers to an object included in an image which depicts a document (as opposed to non-document objects such as a user's face). For example, an image that includes a document object may depict a piece of paper with written or printed information, or both that serves as a record. FIG. 6 illustrates an example image of an employee ID 610 (one example of a document object).

Example Document Detection Module

Figure 3:
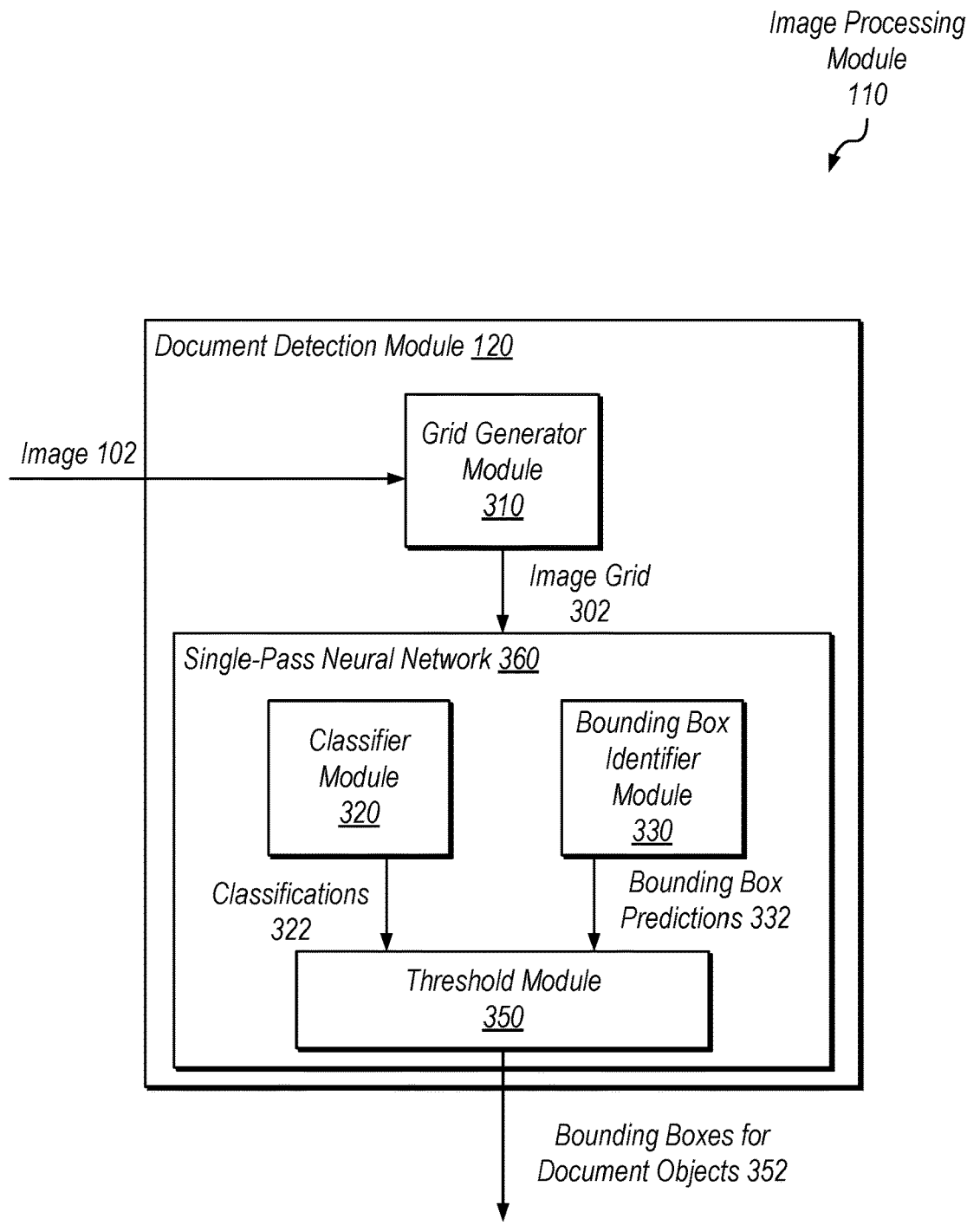
FIG. 3 is a block diagram illustrating an example document detection module, according to some embodiments.

FIG. 3 is a block diagram illustrating an example document detection module. In the illustrated embodiment, document detection module 120 includes a portion generator module 310 and a single-pass neural network 360.

Document detection module 120, in the illustrated embodiment, receives image 102 and generates, using single-pass neural network 360, bounding boxes 352 for one or more document objects included in image 102. Single-pass neural network 360 may be trained using the techniques discussed above with reference to FIGS. 2A and 2B. Document detection module 120 provides image 102 to portion generator module 310. This module divides image 102 into an S-by-S grid of cells and inputs this image grid 302 into single-pass neural network 360, where S may be any real-number. For example, image grid 302 may be a 5×5 grid of image 102 with a total of 25 cells. Note that single-pass neural network 360 is one non-limiting example machine learning module that may be used to predict bounding boxes for document objects and that any of various types of machine learning module may be used to predict bounding boxes for document objects, in other embodiments. A bounding box for a document object includes the smallest enclosing box or outline that can be drawn around a document object. For example, a bounding box may be used to indicate the area of an image which a particular document occupies. FIG. 6 discussed below shows an example bounding box 332 of an employee ID 610.

Classifier module 320 evaluates the image grid 302 to detect one or more objects included in image 102. Classifier module 320 then determines classification values 322 for detected objects. For example, for each object included in the image 102, classifier module 320 determines whether it is a document object. Specifically, classifier module 320 is executable to generate binary classifications for objects included in a document. For example, classifier module 320 may either classify an object as a document or not. That is, the classifier module 320 identifies documents in the image using a binary classification, e.g., 1, the object in the image is a document or 0, the object in the image is not a document. The binary classification performed by classifier module 320 is a single-class probability and, as such, is in contrast to a set of class probabilities that a YOLO neural network normally generates. For example, YOLO networks generally output non-binary classifications such as a set of class probabilities for each grid cell included in an image grid. As one example, a YOLO model may output a set of three different class predictions for one grid cell in an image grid. For example, a set of class probabilities may include three different classes of animal (e.g., a dog, a cat, and a bird), and a YOLO network may predict whether an object in a particular grid cell is one of the three different classes of animal.

Binary classifications output by classifier module 320 are conditioned on the grid cells of image grid 302 including one or more objects. Specifically, if the center of an object falls within a particular grid cell included in image grid 302, then classifier module 320 will detect this object when evaluating this particular grid cell and then predict whether this object is a document. A given grid cell may contain multiple different objects (or portions thereof) and classifier module 320 may generate binary classifications for each object whose center falls within a given grid cell.

Bounding box identifier module 330 receives image grid 302. For each grid cell included in image grid 302, module 330 generates one or more bounding box predictions 332. For example, if multiple objects (or portions thereof) appear within a given grid cell, then module 330 will generate predictions for the bounding boxes of those multiple objects. In some embodiments, in addition to predicting these bounding boxes, module 330 outputs confidence values indicating how confident the module is that the box contains one or more objects as well as how accurate the module thinks its prediction is for the bounding boxes of these objects. The confidence value may be represented as the intersection over union (IOU) between the predicted bounding box and a ground truth bounding box. For example, if there is no object within a given grid cell, then the confidence score output by module 330 would be zero. As such, the confidence score reflects the presence or absence of an object within a grid cell. Specifically, bounding box identifier module 330 may output bounding box predictions with five components: x- and y-coordinates that represent the center of the bounding box, width and height dimensions for the bounding box, and a confidence score.

Threshold module 350, in the illustrated embodiment receives classification values 322 and bounding box predictions 332 and outputs the bounding boxes 352 for document objects. For example, threshold module 350 may only output bounding boxes 352 for objects whose classification values 322 are above a threshold classification value. As one example, classifier module 320 may output classification values from 0 to 1, with 0 indicating that an object is not a document and 1 indicating that an object is a document. In this example scenario, the threshold classification value may be 0.7 such that any classification values that meet (are equal to or greater than) this threshold value are then used by threshold module 350 to select from bounding box predictions 332. Said another way, threshold module 350 may only output bounding boxes 352 for objects in image 102 that are classified as documents by classifier module 320.

Example Type Determination Module

Figure 4:
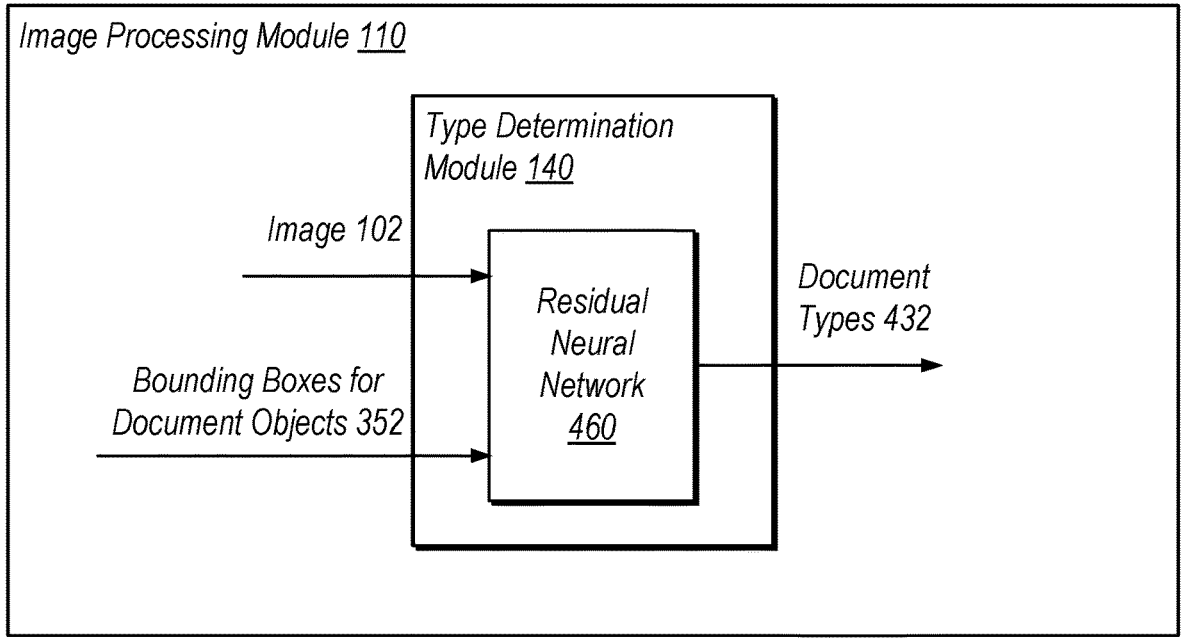
FIG. 4 is a block diagram illustrating an example type determination module, according to some embodiments.

FIG. 4 is a diagram illustrating a detailed example of a type determination module. In the illustrated embodiment, system 400 includes type determination module 140 with a residual neural network 460.

Type determination module 140, in the illustrated embodiment, receives image 102 from image processing module 110 and bounding boxes 352 for document objects from document detection module 120. Type determination module 140 inputs image 102 and bounding boxes 352 into residual neural network 460. Based on this information, residual neural network 460 predicts one or more document types 432 for document objects included in image 102. Residual neural network 460 may be trained using the techniques discussed above with reference to FIGS. 2A and 2B. Note that although residual neural network 460 is included as an example of a computer vision module that might be used to predict document types, any of various types of computer vision techniques may be used to determine these predictions.

As discussed above with reference to FIGS. 2A and 2B, residual neural network 460 may be trained to recognized documents that match known document types. For example, residual neural network 460 may predict document types 432 for documents included in image 102 based on attributes of those documents. These attributes may include types of information (names, dates, geographic location, titles, descriptions, etc.), locations of information within a document, style of the document (text, images, icons, etc.), etc. For example, if a document includes certain fields in particular locations within the document, then residual neural network 460 may identify that this document resembles a particular known document type. As one specific example, if a document includes a picture of a person, a driver's license number, an issued date, an expiration date, a date of birth, eye color, hair color, height, weight, etc., then residual neural network 460 may determine that this document is a driver's license.

Example Extraction Module

Figure 5:
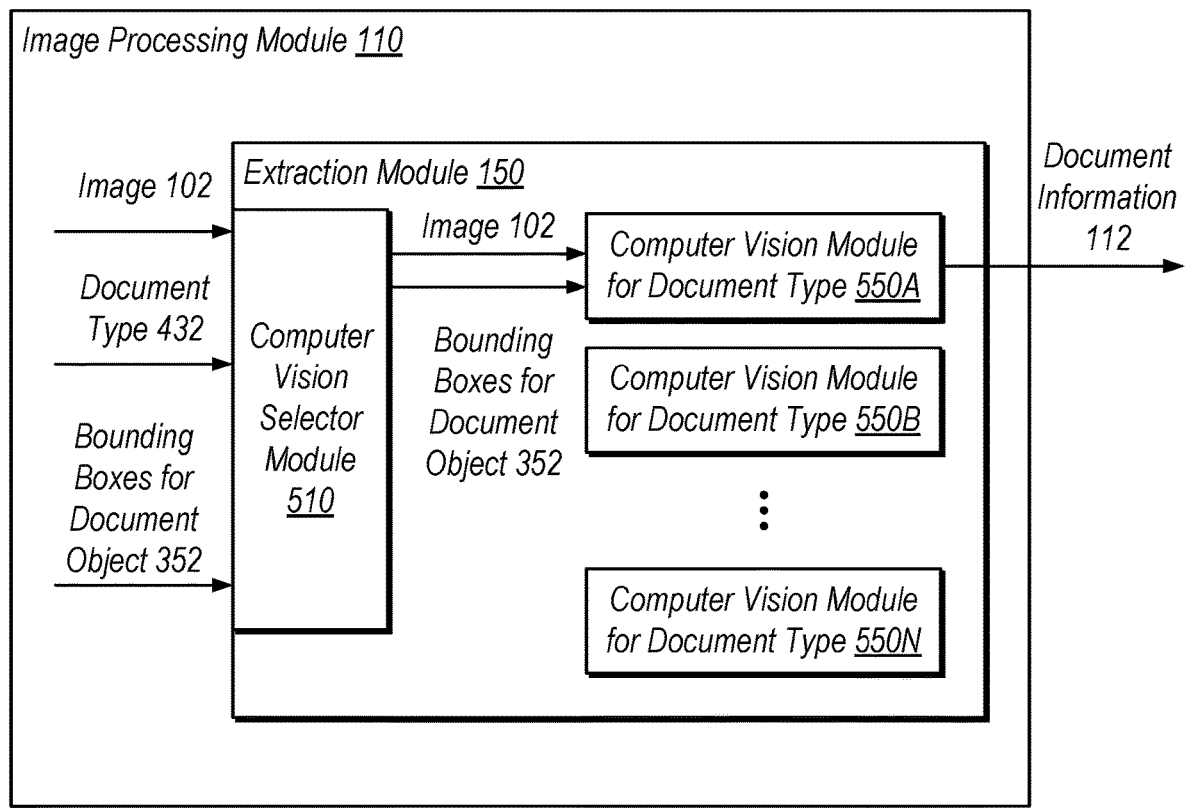
FIG. 5 is a block diagram illustrating an example extraction module, according to some embodiments.

FIG. 5 is a diagram illustrating an example extraction module. In the illustrated embodiment, system 600 includes extraction module 150 with a computer vision selector module 510 and various computer vision modules 550 for different types of documents.

Extraction module 150, in the illustrated embodiment, receives image 102, document type prediction 432, and a bounding box 352 for the document object included in the image and inputs this information to computer vision selector module 510. Based on the document type prediction 432 for the document object included in image 102, computer vision selector module 510 selects a computer vision module 550A. Computer vision selector module 510 then inputs image 102 and bounding box 352 for the document object to computer vision module 550A. This module is executable to extract document information 112 from image 102 based on the bounding box 352 for the document object. For example, computer vision modules 550 may include one or more computer vision models for identifying and extracting information from images or videos, or both. OCR is one example of a computer vision model. In the illustrated embodiment, computer vision module 550A outputs document information 112 specifying data extracted from a document object included in image 102.

In some embodiments, image 102 includes multiple documents and extraction module 150 receives type predictions 432 and bounding boxes 352 for these documents. Based on the information for various different documents, computer vision selection module 510 selects computer vision modules 550 corresponding to the different document types specified in the type predictions 432 received from type determination module 140. In some embodiments, the computer vision modules 550 included in extraction module 150 include templates for extracting data from their respective types of documents. In other embodiments, these computer vision modules 550 perform OCR on selective portions of an image of a document based on the document type prediction 432. For example, computer vision module 550A may know to perform OCR on the upper right portion of a document based on the document being a passport.

In some embodiments, system 500 (or some other system) uses document information 112 to onboard a customer as part of KYC process. The extraction of information 112 based on document type prediction 432 may advantageously decrease the processing time for onboarding new or updating existing customers. This, in turn, may improve customer experience by reducing feedback time for these customers when they open new accounts with a customer relationship management service, for example.

Example Image with Document Object

FIG. 6 is a diagram illustrating a detailed example image of a document object. In the illustrated embodiment, image 102 includes an employee identifier (ID) 610 and a bounding box prediction 332 for the employee ID. Employee ID 610 includes an image and name of "John Doe." Note that, in the illustrated embodiment, two other objects are depicted in image 102, a triangular object and a keyboard. In some embodiments, document detection module 120 shown in FIG. 3 generates bounding box predictions 332 for these objects in addition to employee ID 610. Threshold module 350, however, will not provide these bounding box predictions to type determination module 140 based on these bounding boxes being for objects which are not documents (indicated by classification values 322 generated by classifier module 320).

In the illustrated embodiment, image 102 is shown with gridlines dividing the image into various grid cells. As discussed above with reference to FIG. 3, grid generator module 310 of document detection module 120 may generate an image grid 302 such as that shown in FIG. 6. This image grid 302 is then used by the single-pass neural network 360 to perform binary document object classifications and to determine bounding boxes for objects included in image 102. For example, based on the center of employee ID 610 falling within a center grid cell that is four cells from the left side of the image and six grid cells from the top of the image, classifier module 320 will use this center grid cell to determine a document classification and bounding box for employee ID 610. Note that bounding box identifier module 330 may determine bounding boxes for the triangle object and keyboard shown in FIG. 6 as well as a bounding box for employee ID 610. In this example, threshold module 350, however, will only provide the bounding box for employee ID 610 to type determination module 140 for determining what type of document corresponds to employee ID 610.

Example Methods

Figure 7:
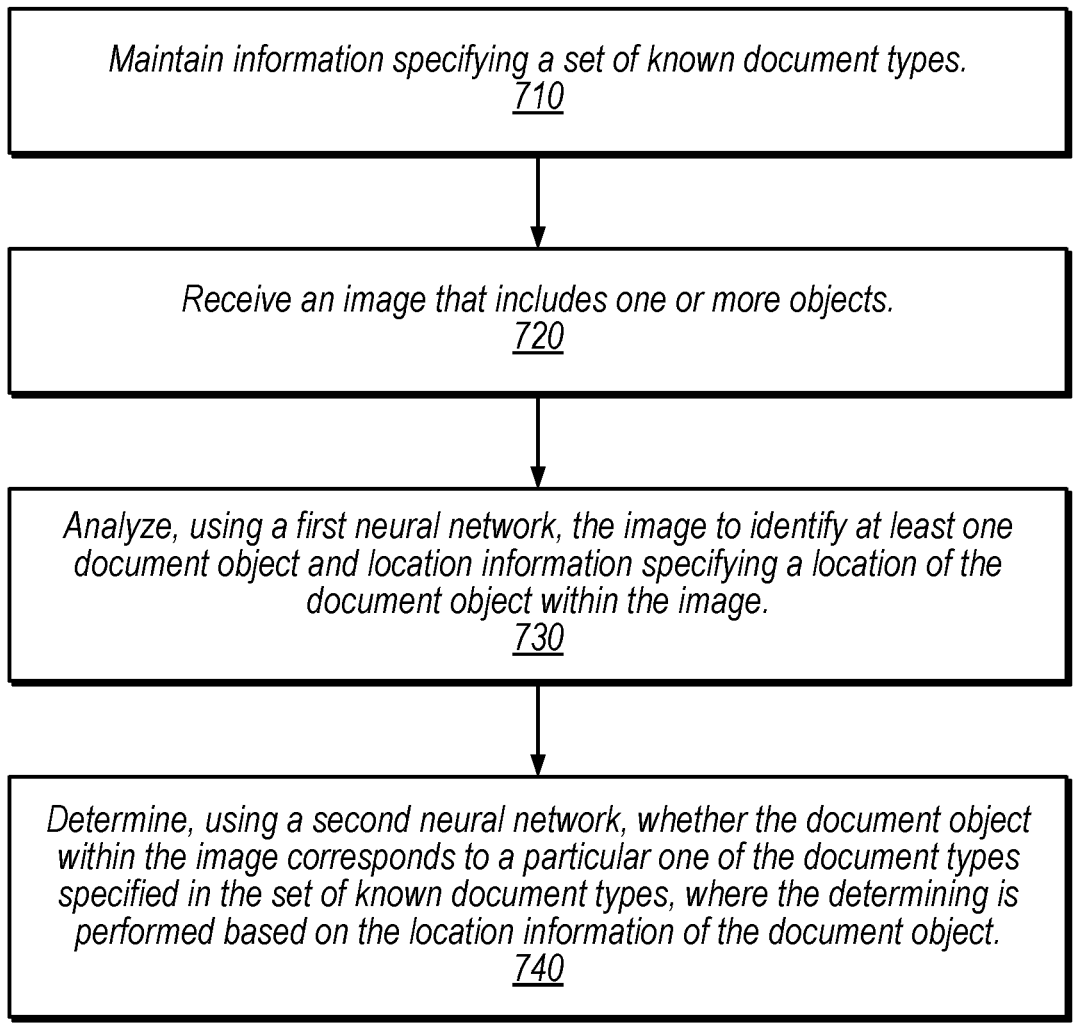
FIG. 7 is a flow diagram illustrating a method for determining a document type for a document object included in an image, according to some embodiments.

FIG. 7 is a flow diagram illustrating a method for determining a document type for a document object included in an image, according to some embodiments. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 710, in the illustrated embodiment, a computing system maintains information specifying a set of known document types. For example, during training, a machine learning module (such as residual neural network 460) learns about certain types of documents which are referred to herein as a "set of known document types" that are stored by the computing system for subsequent recognition. The set of known document types may include, for example, a passport, an employee ID (e.g., a PayPal employee badge), a driver's license, etc. In some embodiments, the set of known document types are documents that are recognized and processed by an image processing system (one example of the computing system). For example, in the CRM context, a CRM system may recognize an employee ID as an acceptable form of identification for opening a user account and the system may include templates for extracting important information from the employee ID.

At 720, the computing system receives an image that includes one or more objects. For example, the image may depict various objects on a user's desk, including a document, such as the image 102 shown in FIG. 6.

At 730, the computing system analyzes, using a first neural network, the image to identify at least one document object and location information specifying a location of the document object within the image. In some embodiments, the document object identification performed by the first neural network is a binary classification that indicates whether or not the one or more objects included in the image are document objects. In some embodiments, the location information includes dimensions of a bounding box of the document object.

At 740, the computing system determines, using a second neural network, whether the document object within the image corresponds to a particular one of the document types specified in the set of known document types, where the determining is performed based on the location information of the document object. In some embodiments, the first neural network is a you-only-look-once (YOLO) neural network and the second neural network is a residual neural network (ResNet).

In some embodiments, the computing system assigns, based on the determining, the particular document type to the document object. In some embodiments, the computing system extracts, based on the particular document type, information from the at least one document object, where the extracting is performed using a computer vision model. In some embodiments, the computing system associates the extracted information with a user information account associated with a user from which the image was received. In some embodiments, prior to the analyzing, the computing system receives, from the user, a set of changes for the received image, wherein the set of changes includes one or more edits associated with image quality.

In some embodiments, prior to the image, the second neural network is trained by receiving a training set that includes a set of images. In some embodiments, the second neural network generates, based on the training set, output, where the output includes determined document types for objects included in the set of images and confidence scores for the determined document types. In some embodiments, the computing system requests, from the user, feedback for output of the second neural network. In some embodiments, the computing system receives, from the user, feedback that includes one or more weights for the training set, where the one or more weights are generated based on the confidence scores for the determined document types and whether the determined document types match known document types. In some embodiments, the computing system updates the second neural network based on the feedback. In some embodiments, prior to training the second neural network, the computing system generates the training set by requesting, for a set of images that include one or more objects, input from the user for types of documents included in the set of images. In some embodiments, the computing system generates, based on receiving input from the user and the set of images, the training set, where the input includes at least information specifying document types for document objects included in the set of images.

In some embodiments, the computing system determines, via the second neural network, that the document object included in the image does not correspond to one of the document types included in the set of known document types. In some embodiments, the computing system determines to add a new document type corresponding to the document object to the set of known document types. In some embodiments, in response to determining to add a new document type corresponding to the document object, the computing system updates the set of known documents types to include the new document type. In some embodiments, the computing system performs, using a new training set, additional training of the second neural network, where the new training set includes the image and a new document type assigned, by a user, to the document object included in the image.

In some embodiments, prior to receiving the image, the computing system trains the single-pass neural network by receiving a training set that includes a set of images. In some embodiments, the single-pass neural network then generates, based on the training set, output, where the output includes determined document object classifications and location information for objects included in the set of images. In some embodiments, the computer system requests, from a user, feedback for output of the single-pass neural network. In some embodiments, the computing system receives, from the user, feedback that includes one or more weights for the training set, wherein the one or more weights are generated based on the determined document object classifications and location information. In some embodiments, the computing system updates the single-pass neural network based on the feedback. In some embodiments, prior to training the single-pass neural network, the computing system generates the training set by requesting, from the user, input for a set of images that includes one or more objects. In some embodiments, the computing system generates, based on receiving input from the user and the set of images, the training set, where the input includes at least information specifying document object classifications for objects included in the set of images and location information for the objects that are classified as documents.

In some embodiments, the computing system rejects the received image based on one or more of the following types of criteria: the single-pass neural network being unable to identify a document object, the single-pass neural network being unable to identify location information, and the residual neural network being unable to determine a document type for the document object. In some embodiments, if the computing system is unable to extract information from an image of a document using computer vision techniques, for example, then the computing system may reject the document and/or request that a user upload a new image of the document (or other additional documentation).

Figure 8:
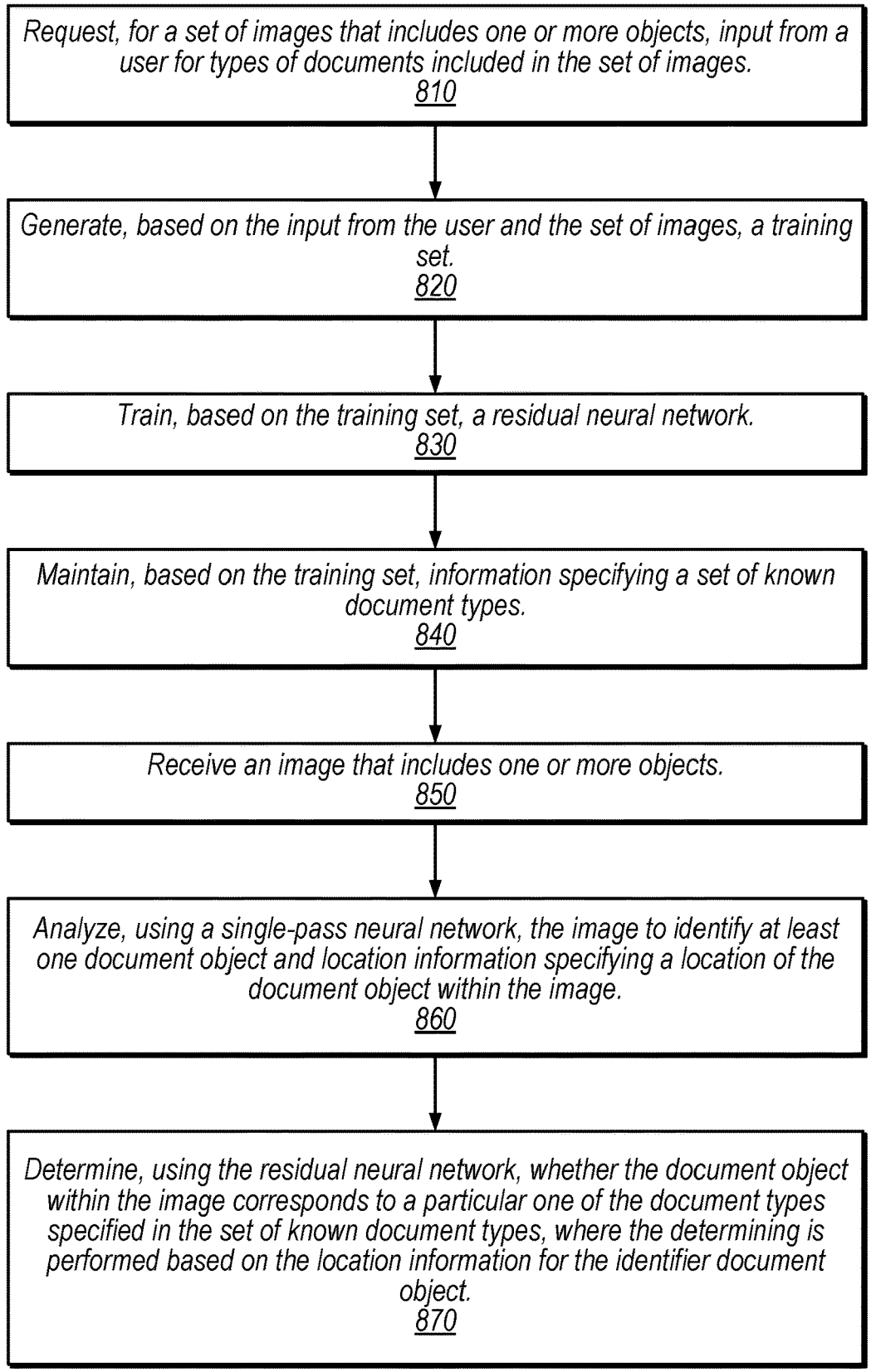
FIG. 8 is a flow diagram illustrating a method for training and using a residual neural network to determine a document type for a document object included in an image, according to some embodiments.

FIG. 8 is a flow diagram illustrating a method for training and using a residual neural network to determine a document type for a document object included in an image, according to some embodiments. The method shown in FIG. 8 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 810, in the illustrated embodiment, a computing system requests, for a set of images that include one or more objects, input from a user for types of documents included in the set of images. In some embodiments, the user is a system administrator. In some embodiments, the input specifies types of documents included in various images and whether these types of documents are acceptable documents. For example, certain types of documents may not be accepted by an image processing system (e.g., for onboarding users).

At 820, the computing system generates, based on the input from the user and the set of images, a training set. In some embodiments, the training set includes various machine learning input features (e.g., images) with known labels (e.g., document types included in the images). For example, the training set may include an image of a driver's license and the label for this image specifies that it is a driver's license issued from the state of Texas.

At 830, the computing system trains a residual neural network based on the training set. For example, the computing system may input images with training labels into a residual neural network and may adjust training weights based on the output of the residual neural network.

At 840, the computing system maintains, based on the training set, information specifying a set of known document types. In some embodiments, the set of known document types is generated and maintained based on user input specifying types of documents included in the set of images and types of documents that are acceptable. For example, the set of known document types may include a list of documents that are accepted for onboarding a user, while the training set used to train the residual neural network may include images with training labels indicating types of documents that are not accepted.

At 850, the computing system receives an image that includes one or more objects. One example of such an image is discussed in detail above with reference to FIG. 6.

At 860, the computing system analyzes, using a single-pass neural network, the image to identify at least one document object and location information specifying a location of the document object within the image. For example, the image may include three different objects, but only one of the three is a document. In some embodiments, the single-pass neural network is a YOLO network. In some embodiments, the location information includes bounding boxes of documents within the image.

At 870, the computing system determines, using the residual neural network, whether the document object within the image corresponds to a particular one of the document types specified in the set of known document types, where the determining is performed based on the location information for the identified document object. In some embodiments, the computing system extracts information from the document object based the document type corresponding to a particular known type of document. In some embodiments, the extraction is performed using a computer vision model.

Example Computing Device

Figure 9:
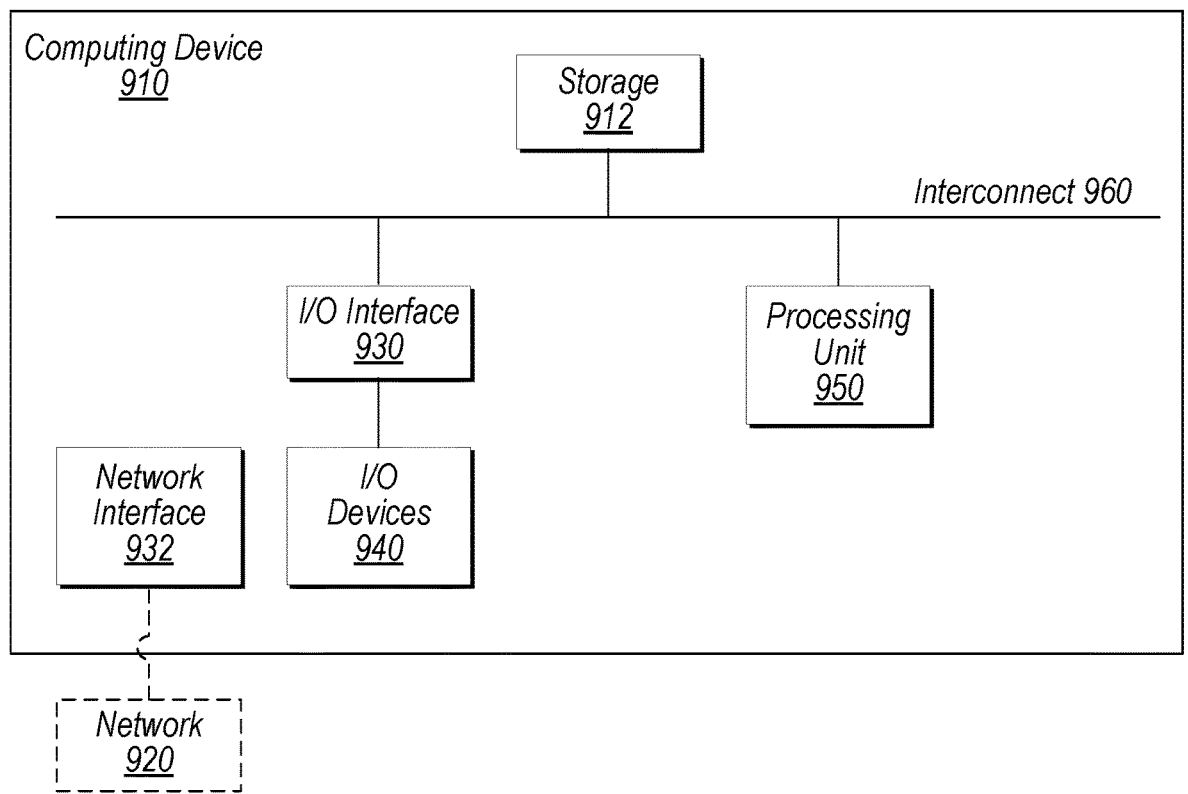
FIG. 9 is a block diagram illustrating an example computing device, according to some embodiments.

Turning now to FIG. 9, a block diagram of one embodiment of computing device (which may also be referred to as a computing system) 910 is depicted. Computing device 910 may be used to implement various portions of this disclosure. Computing device 910 may be any suitable type of device, including, but not limited to, a personal computer system, desktop computer, laptop or notebook computer, mainframe computer system, web server, workstation, or network computer. As shown, computing device 910 includes processing unit 950, storage 912, and input/output (I/O) interface 930 coupled via an interconnect 960 (e.g., a system bus). I/O interface 930 may be coupled to one or more I/O devices 940. Computing device 910 further includes network interface 932, which may be coupled to network 920 for communications with, for example, other computing devices.

In various embodiments, processing unit 950 includes one or more processors. In some embodiments, processing unit 950 includes one or more coprocessor units. In some embodiments, multiple instances of processing unit 950 may be coupled to interconnect 960. Processing unit 950 (or each processor within 950) may contain a cache or other form of on-board memory. In some embodiments, processing unit 950 may be implemented as a general-purpose processing unit, and in other embodiments it may be implemented as a special purpose processing unit (e.g., an ASIC). In general, computing device 910 is not limited to any particular type of processing unit or processor subsystem.

Storage subsystem 912 is usable by processing unit 950 (e.g., to store instructions executable by and data used by processing unit 950). Storage subsystem 912 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 912 may consist solely of volatile memory, in one embodiment. Storage subsystem 912 may store program instructions executable by computing device 910 using processing unit 950, including program instructions executable to cause computing device 910 to implement the various techniques disclosed herein.

I/O interface 930 may represent one or more interfaces and may be any of various types of interfaces configured to couple to and communicate with other devices, according to various embodiments. In one embodiment, I/O interface 930 is a bridge chip from a front-side to one or more back-side buses. I/O interface 930 may be coupled to one or more I/O devices 940 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
maintaining, by a computing system, information specifying a set of known document types;
receiving, by the computing system, an image that includes one or more objects;
analyzing, by the computing system using a first neural network, the image to identify at least one document object and location information specifying a location of the document object within the image; and
determining, by the computing system using a second, different neural network, whether the document object within the image corresponds to a particular one of the document types specified in the set of known document types, wherein the determining is performed based on the location information of the document object.

2. The method of claim 1, further comprising:
assigning, by the computing system based on the determining, the particular document type to the document object; and
extracting, by the computing system based on the particular document type, information from the at least one document object, wherein the extracting is performed using a computer vision model.

3. The method of claim 2, further comprising:
associating, by the computing system, the extracted information with a user information account associated with a user from which the image was received.

4. The method of claim 3, further comprising:
prior to analyzing, receiving, by the computing system from the user, a set of changes for the received image, wherein the set of changes includes one or more edits associated with image quality.

5. The method of claim 2, wherein the first neural network is a you-only-look-once (YOLO) neural network, and wherein the second neural network is a residual neural network (ResNet).

6. The method of claim 1, wherein the document object identification performed by the first neural network is a binary classification that indicates whether or not the one or more objects included in the image are document objects.

7. The method of claim 1, wherein prior to receiving the image, the second neural network is trained by:
receiving a training set, wherein the training set includes a set of images;
generating, by the second neural network based on the training set, output, wherein the output includes determined document types for objects included in the set of images and confidence scores for the determined document types;
requesting, from a user, feedback for output of the second neural network;
receiving, from the user, feedback that includes one or more weights for the training set, wherein the one or more weights are generated based on the confidence scores for the determined document types and whether the determined document types match known document types; and
updating the second neural network based on the feedback.

8. The method of claim 7, wherein prior to training the second neural network, the training set is generated by:
requesting, for a set of images that include one or more objects, input from the user for types of documents included in the set of images; and
generating, based on receiving input from the user and the set of images, the training set, wherein the input includes at least information specifying document types for document objects included in the set of images.

9. The method of claim 1, further comprising:
determining, by the computing system via the second neural network, that the document object included in the image does not correspond to one of the document types included in the set of known document types;
determining, by the computing system, to add a new document type corresponding to the document object to the set of known document types;
in response to determining to add a new document type corresponding to the document object, updating, by the computing system, the set of known documents types to include the new document type; and
performing, by the computing system using a new training set, additional training of the second neural network, wherein the new training set includes the image and a new document type assigned, by a user, to the document object included in the image.

10. The method of claim 1, wherein the location information includes dimensions of a bounding box of the document object.

11. A non-transitory computer-readable medium having instructions stored thereon that are executable by a computing device to perform operations comprising:
maintaining information specifying a set of known document types;
receiving an image that includes one or more objects;
analyzing, using a single-pass neural network, the image to identify at least one document object and bounding box information for the document object; and
determining, using a residual neural network, whether the document object within the image corresponds to a particular one of the document types specified in the set of known document types, wherein the determining is performed based on the bounding box information for the identified document object.

12. The non-transitory computer-readable medium of claim 11, wherein the operations further comprise:
assigning, based on the determining, the particular document type to the document object; and
extracting, based on the particular document type, information from the at least one document object, wherein the extracting is performed using a computer vision model.

13. The non-transitory computer-readable medium of claim 11, wherein the document object identification performed by the single-pass neural network is a binary classification that indicates whether or not the one or more objects included in the image are document objects.

14. The non-transitory computer-readable medium of claim 11, wherein prior to receiving the image, the single-pass neural network is trained by:
receiving a training set, wherein the training set includes a set of images;
generating, by the single-pass neural network based on the training set, output, wherein the output includes determined document object classifications and location information for objects included in the set of images;
requesting, from a user, feedback for output of the single-pass neural network;
receiving, from the user, feedback that includes one or more weights for the training set, wherein the one or more weights are generated based on the determined document object classifications and location information; and
updating the single-pass neural network based on the feedback.

15. The non-transitory computer-readable medium of claim 14, wherein prior to training the single-pass neural network, the training set is generated by:
requesting, from a user, input for a set of images that includes one or more objects; and
generating, based on receiving input from the user and the set of images, the training set, wherein the input includes at least information specifying document object classifications for objects included in the set of images and location information for the objects that are classified as documents.

16. The non-transitory computer-readable medium of claim 11, further comprising:
rejecting the received image based on one or more of the following types of criteria: the single-pass neural network being unable to identify a document object, the single-pass neural network being unable to identify location information, and the residual neural network being unable to determine a document type for the document object.

17. A method, comprising:
requesting, by a computing system for a set of images that include one or more objects, input from a user for types of documents included in the set of images;
generating, by the computing system based on the input from the user and the set of images, a training set;

training, by the computing system based on the training set, a residual neural network;

maintaining, by the computing system based on the training set, information specifying a set of known document types;

receiving, by the computing system, an image that includes one or more objects;

analyzing, by the computing system using a single-pass neural network, the image to identify at least one document object and location information specifying a location of the document object within the image; and determining, by the computing system using the residual neural network, whether the document object within the image corresponds to a particular one of the document types specified in the set of known document types, wherein the determining is performed based on the location information for the identified document object.

18. The method of claim 17, further comprising:

assigning, by the computing system based on the determining, the particular document type to the document object; and extracting, by the computing system based on the particular document type, information from the at least one document object, wherein the extracting is performed using a computer vision model.

19. The method of claim 17, wherein the document object identification performed by the single-pass neural network is a binary classification that indicates whether or not the one or more objects included in the received image are document objects.

20. The method of claim 17, wherein the training includes:

generating, by the residual neural network based on the training set, output, wherein the output includes determined document types for objects included in the set of images and confidence scores for the determined document types;

requesting, from a user, feedback for output of the residual neural network;

receiving, from the user, feedback that includes one or more weights for the training set, wherein the one or more weights are generated based on the confidence scores for the determined document types and whether the determined document types match known document types; and updating the residual neural network based on the feedback.

* * * * *